United States Patent [19]
Stockton

[11] Patent Number: 5,383,542
[45] Date of Patent: Jan. 24, 1995

[54] OVERRUNNING CLUTCH

[75] Inventor: Thomas R. Stockton, Ann Arbor, Mich.

[73] Assignee: Ford Motor Company, Dearborn, Mich.

[21] Appl. No.: 172,990

[22] Filed: Dec. 27, 1993

[51] Int. Cl.$^6$ ............................................. F16D 41/07
[52] U.S. Cl. ................... 192/45.1; 192/41 A; 192/103 B; 192/105 CE
[58] Field of Search ............... 192/45.1, 41 A, 103 B, 192/105 CE, 89.1

[56] References Cited

U.S. PATENT DOCUMENTS

| | | |
|---|---|---|
| 1,596,599 | 8/1926 | Lavaud ........................ 192/45.1 X |
| 3,443,672 | 4/1967 | Giese . |
| 3,547,239 | 12/1970 | Titt . |
| 3,702,649 | 11/1972 | Giese et al. . |
| 3,729,076 | 4/1973 | de Lavalette . |
| 3,844,391 | 10/1974 | Hallerberg . |
| 3,978,950 | 9/1976 | Timtner ........................ 192/45.1 X |
| 3,997,041 | 12/1976 | Judd et al. ...................... 192/45.1 X |
| 4,162,000 | 7/1979 | Zlotek ........................... 192/45.1 X |
| 4,819,775 | 4/1989 | Witt et al. ...................... 192/41 A |
| 4,867,292 | 9/1989 | Hartig . |
| 5,096,035 | 3/1992 | Bradfield . |

FOREIGN PATENT DOCUMENTS

| | | | |
|---|---|---|---|
| 914771 | 10/1946 | France ........................... 192/41 A |
| 204620 | 10/1923 | United Kingdom ............. 192/45.1 |

*Primary Examiner*—Andrea L. Pitts
*Attorney, Agent, or Firm*—Mark S. Sparschu; Roger L. May

[57] ABSTRACT

An overrunning clutch has a driving race and a driven race. The clutch further has cams, each with a locking portion which allows torque transmission in a predetermined direction only from the driving race to the driven race. The locking portions of some of the cams can be engaged between the driving race and the driven race by gravity. The locking portions of all of the cams tend to become engaged by centrifugal force. The clutch additionally has rollers between the driving race and the driven race to maintain the spacing between the driving race and the driven race.

10 Claims, 2 Drawing Sheets

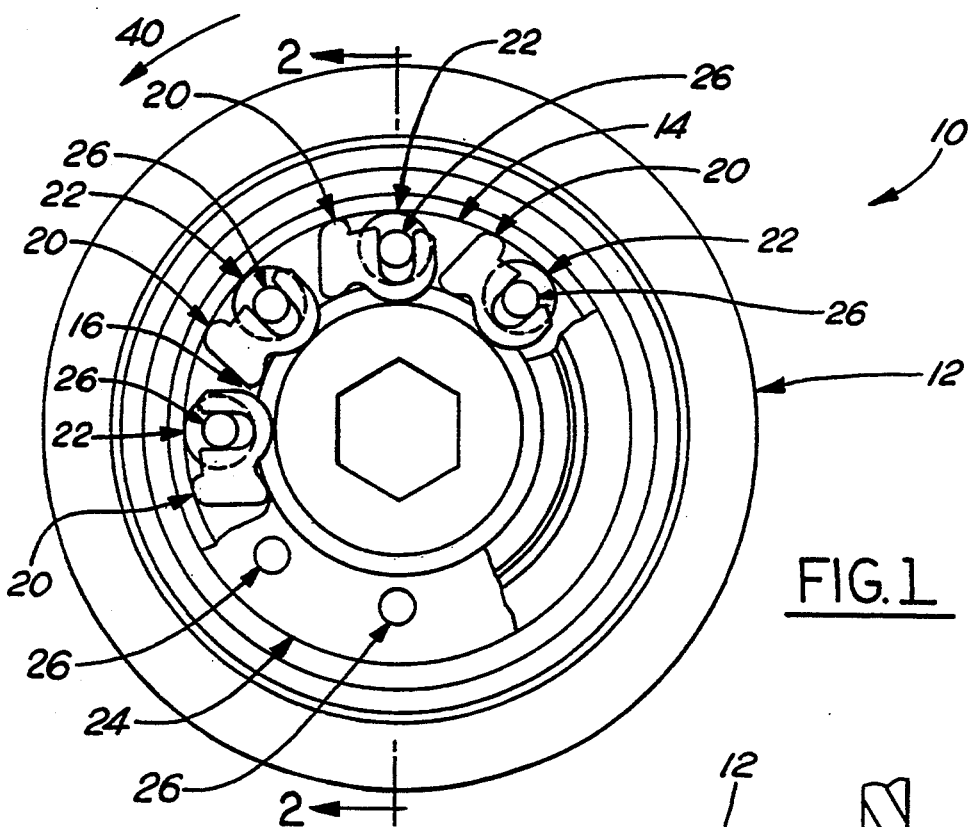
FIG.1
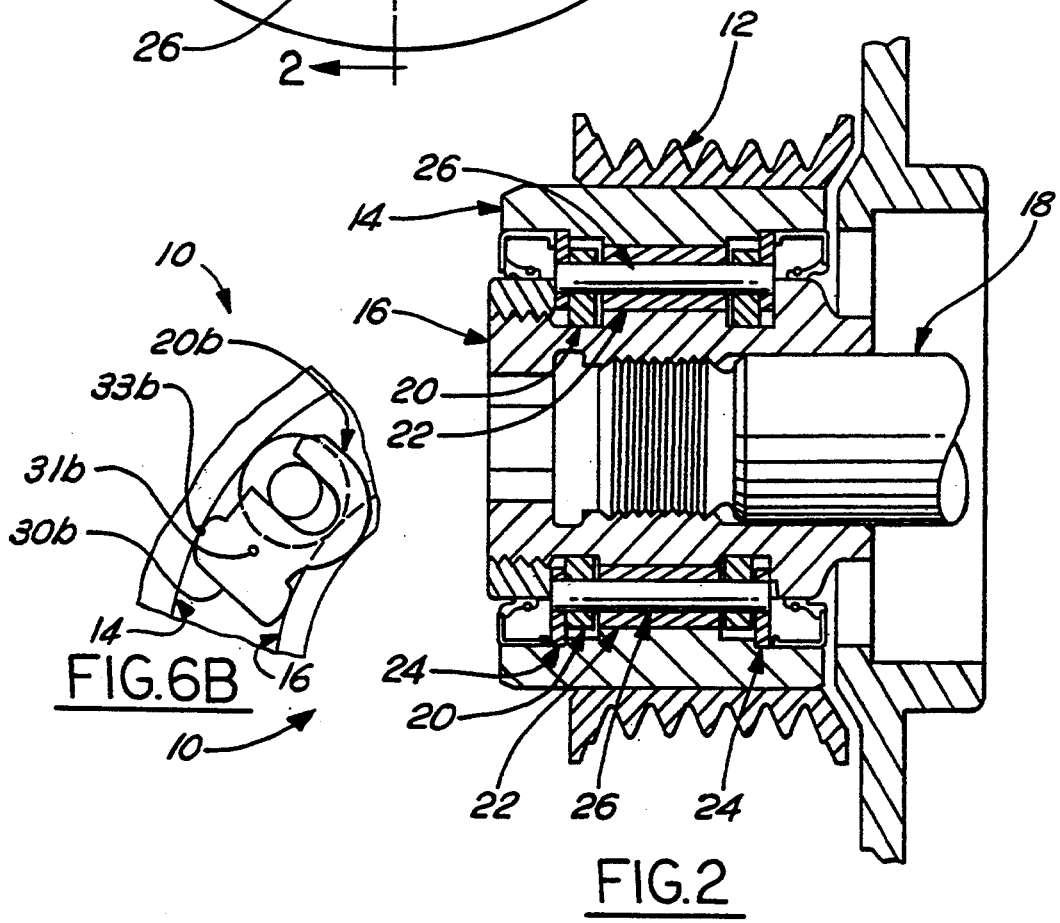
FIG.6B
FIG.2

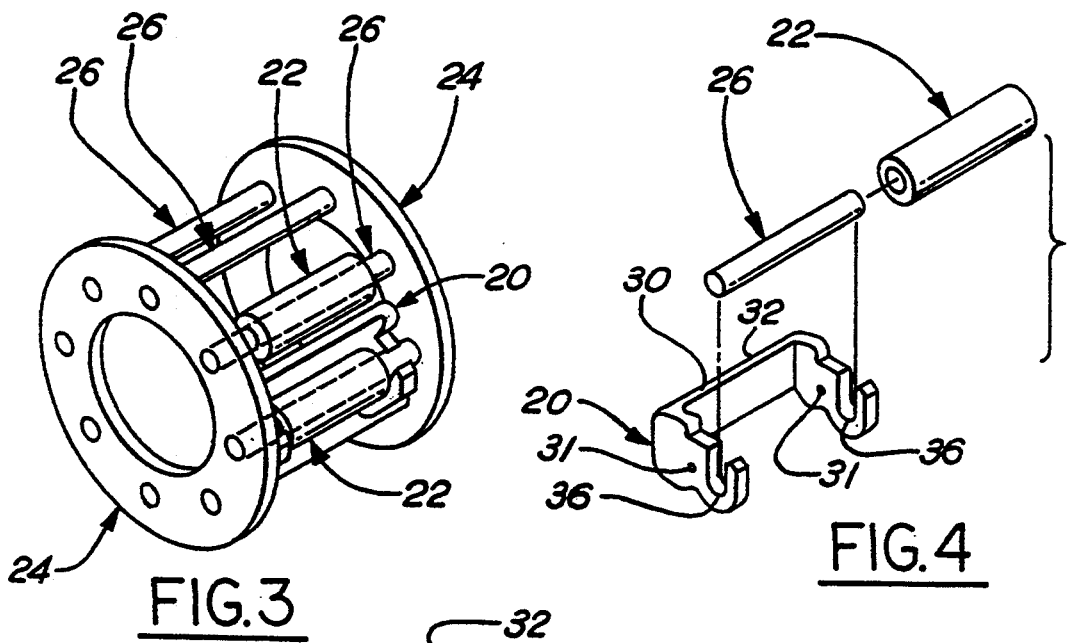
FIG. 3
FIG. 4
FIG. 5
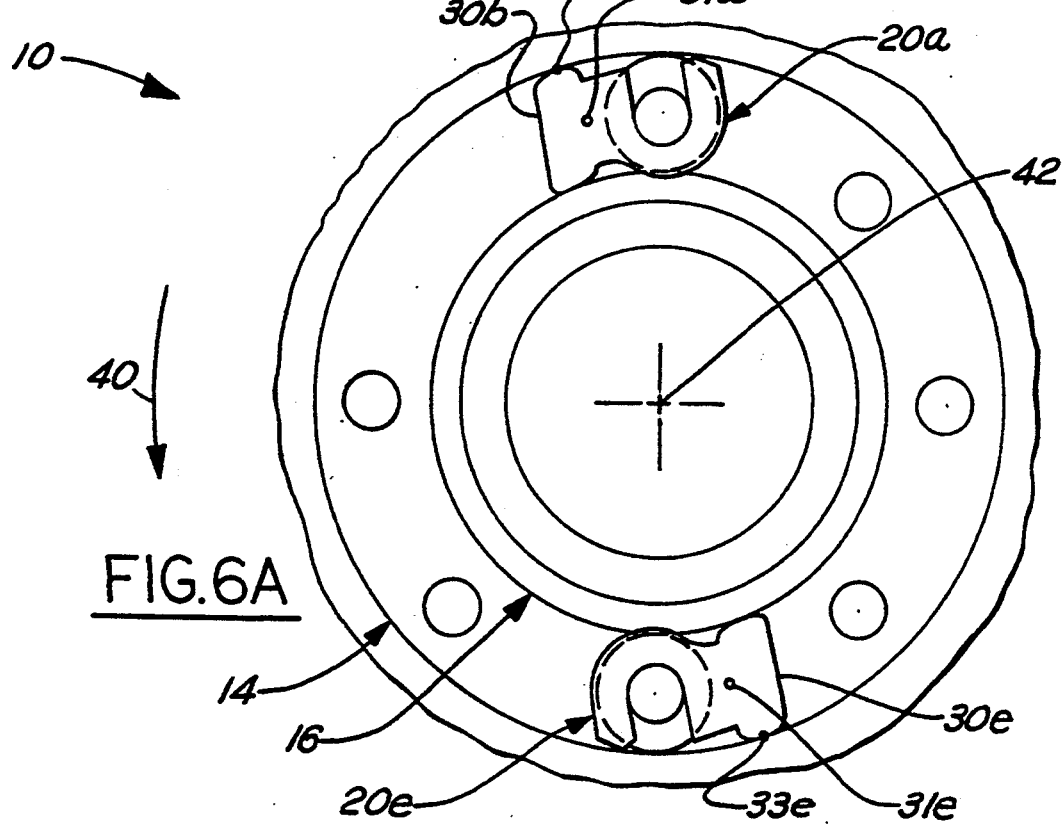
FIG. 6A

OVERRUNNING CLUTCH

BACKGROUND OF THE INVENTION

1. Field of the Invention

The present invention relates to an overrunning clutch.

2. Description of the Related Art

In rotating devices where one member (the "driving member") transmits torque to another member (the "driven member"), it is often advantageous to assure that torque is transmitted in one direction only and only from the driving member to the driven member. An automobile alternator is one such device.

As is well-known in the art, an automobile alternator is typically provided mechanical power from a V-belt attached to the automobile's engine. This belt drives a pulley, or sheave, on the alternator. This sheave proceeds to turn a shaft which drives a rotor in the alternator. The rotation of this rotor generates electricity.

A problem occurs, however, in the use of an alternator. This problem occurs when the engine is driving an alternator at a given speed and the automobile's transmission is in a given gear. If the transmission upshifts to a higher gear, the engine speed decreases abruptly. As a result, the V-belt driving the alternator abruptly decreases in speed as well. However, typical alternator rotors have considerable rotational inertia, which opposes the V-belt's abrupt decrease in speed. As a result, the alternator actually attempts to drive the V-belt. However, the interface between the V-belt and the sheave frequently cannot carry the resultant torque, which can be quite large. As a result, the V-belt may slip on the sheave, causing an audible and annoying squeal. An overrunning clutch, which would prevent the alternator from attempting to drive the V-belt in the manner just described, would prevent the squeal.

An overrunning clutch used in an alternator would typically take the form of an outer cylindrical "race", which would be connected to the sheave; and an inner cylindrical race, which would be connected to the alternator rotor. Engaging means arranged between the races would allow the V-belt to drive the alternator but would "overrun", not allowing torque transmission, when the alternator attempts to drive the V-belt.

The use of a simple roller-type overrunning clutch, well-known in the art, would help eliminate the belt squeal. However, roller-type clutches have springs which hold each roller member which engages the two races. At the high speeds experienced by an alternator (upwards of 18,000 revolutions per minute), the springs in a roller-type clutch will typically allow the engaging members to disengage from the two races. When the alternator speed reduces, the engaging members will re-engage, typically with a significant shock. Such a shock is a detriment to the reliability of the clutch.

U.S. Pat. No. 3,844,391 discloses an overrunning clutch which comprises sprags disposed between an inner and outer race. The sprags are held in engagement between the races by a spring. The sprags furthermore disengage by centrifugal force to prevent torque transmission from the driven race to the driving race. Although this configuration may be effective as an overrunning clutch, a more reliable and cost-effective design could result if the springs could be eliminated.

One additional concern in the design of an overrunning clutch for an alternator is due to a rather unique feature of an alternator. This feature is the driving of the alternator with a sheave. Because the sheave has a significant radius, such a driving mechanism causes substantial side loading on the alternator (typically in the range of 200 to 300 pounds). This loading causes an oscillation as the alternator rotates, which would cause the space between the races of an overrunning clutch to increase and decrease in size as the alternator rotates. Such an oscillation would tend to cause fretting wear of clutch members disposed between the races.

Therefore, an overrunning clutch which does not disengage at high speeds, which uses no springs, and which withstands side loading without oscillation will provide advantages over the prior art.

SUMMARY OF THE INVENTION

The present invention provides an overrunning clutch having a driving race with a substantially cylindrical surface. The clutch further has a driven race with a substantially cylindrical surface concentric with and facing the driving race. The clutch also comprises a plurality of cams distributed between the driving race and the driven race. Each cam comprises a locking portion comprising a first locking surface and a second locking surface. The locking portion has a profile such that there is an orientation in which the locking portion is wedged between the driving race and the driven race, allowing torque transfer from the driving race to the driven race in a predetermined direction. However, torque transmission from the driven race to the driving race in that same predetermined direction is not supported by the locking portion of the cam. Each cam has a center of gravity such that a force applied at the center of gravity will move the locking portion of the cam into the wedged orientation.

The present invention also provides an overrunning clutch having a driving race with a substantially cylindrical surface. The clutch further has a driven race with a substantially cylindrical surface concentric with the substantially cylindrical surface of the driving race. Additionally, the clutch has at least one torque transfer means disposed between the races for transferring torque from the driving race to the driven race in a predetermined direction and for preventing torque transmission in that direction from the driven race to the driving race. The torque transfer means are capable of engagement by force applied at a center of gravity of the torque transfer means.

A further feature of the present invention is rollers distributed between the driving race and the driven race of the clutch of this invention. The rollers are in contact with both the driving race and the driven race.

The clutch of the present invention provides several advantages over the prior art. First, the clutch remains engaged even at the high rotational speeds encountered by an automobile alternator. Also, the clutch does not use springs to cause engagement of the clutch. Finally, the rollers of the clutch allow the clutch to withstand side loading without the spacing between the races oscillating, thereby preventing fretting wear of the cams.

BRIEF DESCRIPTION OF THE DRAWINGS

FIG. 1 is a front view of the clutch of the present invention.

FIG. 2 is a sectional side view of the clutch of the present invention.

FIG. 3 is a perspective view of a partial assembly of the clutch of FIGS. 1 and 2.

FIG. 4 is a perspective view showing a cam, a pin, and a roller of FIGS. 1, 2, and 3.

FIG. 5 is a side view of the cam of FIG. 4.

FIG. 6A is a front view showing two cams in a wedged orientation within the inner and outer races of FIGS. 1 and 2.

FIG. 6B is a front view showing one cam in an unwedged orientation within the inner and outer races of FIGS. 1 and 2.

DETAILED DESCRIPTION OF THE PREFERRED EMBODIMENT

With reference to FIGS. 1 and 2, alternator 10 comprises a V-belt sheave 12 through which torque is transmitted to alternator 10 from a vehicle's engine. Sheave 12 is connected to a clutch outer race 14. Alternator 10 further comprises a clutch inner race 16 connected to a shaft 18. The alternator's rotor (not shown) is connected to shaft 18. Between clutch outer race 14 and clutch inner race 16 are eight cams 20. In addition, eight rollers 22 are located between clutch outer race 14 and clutch inner race 16. The diameter of each roller 22 is such that there is no clearance between roller 22 and clutch outer race 14 and between roller 22 and clutch inner race 16. Each roller 22 is thus in rolling contact with clutch outer race 14 and clutch inner race 16. Preferably, rollers 22 have a diameter which is slightly larger than the spacing in which they are located between clutch outer race 14 and clutch inner race 16. There is thus a slight pre-load due to the diameter of rollers 22.

Now referring additionally to FIGS. 3 and 4, cams 20 and rollers 22 are retained in a cage assembly between cage end plates 24. Each cam 20 and roller 22 is retained on a pin 26. Each end of each pin 26 is retained in a hole in a cage end plate 24.

Referring now to FIGS. 4 and 5, each cam 20 has a locking portion 30. Locking portion 30 further comprises a first locking surface 32 and a second locking surface 34. Additionally, each cam 20 has two slots 36. Slots 36 are designed to have a loose fit over pin 26, allowing slots 36 to slide along their length on pin 26. Additionally, each end of cam 20 has a center of gravity 31.

Referring to FIGS. 1 and 2, the intended function of the clutch of this invention will be described. In the operation of alternator 10, torque is transmitted to alternator 10 through sheave 12 to outer race 14. Torque is applied through sheave 12 to clutch outer race 14 in the direction depicted by arrow 40 in FIG. 1. When torque is thus applied, the function of the clutch of this invention is to transmit torque from clutch outer race 14 to clutch inner race 16. However, in addition to torque transmission from clutch outer race 14 to clutch inner race 16, the function of the clutch of this invention is to prevent torque from being transmitted from clutch inner race 16 to clutch outer race 14 in direction 40.

Referring to FIG. 6A and 6B, the principle of operation of the clutch of the present invention will be described. In FIG. 6A, two of cams 20a and 20c are shown between outer race 14 and inner race 16. Further, in FIG. 6B, one of cams 20 (cam 20b) is shown between outer race 14 and inner race 16. Locking portions 30a, 30b, and 30e of cams 20a, 20b, and 20e each have profiles (see also FIG. 5) such that locking portions 30a, 30b, and 30e will wedge between clutch outer race 14 and clutch inner race 16. Cams 20a and 20e are shown with their locking portions 30a and 30e so wedged, while cam 20b is shown with its locking portion 30b in a non-wedged orientation. This wedging occurs when cams 20a and 20e rotate counterclockwise about their contact points 33a and 33e with clutch outer race 14. When so wedged, cams 20a and 20e can transmit torque from clutch outer race 14 to clutch inner race 16 in direction 40. Note, however, that this wedging can transmit torque only from clutch outer race 14 to clutch inner race 16. Locking portions 30 cannot support torque from clutch inner race 16 to clutch outer race 14 in direction 40. If clutch inner race 16 attempts to transmit torque to clutch outer race 14 in direction 40, clutch inner race 16 will rotate independently from clutch outer race 14. Cam 20b is shown in a non-wedged orientation.

There are two ways by which locking portions 30 of cams 20 can achieve the wedged orientation illustrated by cams 20a and 20e. The first way is through gravity, the way that some of cams 20 achieve the wedged orientation when alternator 10 begins to operate from rest. Cam 20e in FIG. 6A is positioned such that gravity acts on center of gravity 31e of cam 20e to pull cam 20e into the wedged orientation. Gravity pulls cam 20e into the wedged orientation due to the location of cam 20e below the center of rotation 42 of outer race 14 and inner race 16. Note that cams 20a and 20b are not situated so that gravity tends to pull them into the wedged orientation. Due to the location of cams 20a and 20b above the center of rotation 42 of outer race 14 and inner race 16, gravity actually tends to pull cams 20a and 20b out of the wedged orientation. However, as long as a sufficient number of cams 20 is in fact engaged by gravity, clutch outer race 14 will be able to transmit enough torque to drive clutch inner race 16 when alternator 10 starts from rest.

Centrifugal force is the second way by which locking portions 30 of cams 20 can achieve the wedged orientation and thereby enable torque transmission from outer race 14 to inner race 16 in direction 40. If the speed of rotation of clutch outer race 14 and clutch inner race 16 is sufficient, centrifugal force will act on centers of gravity 31 of cams 20. This will tend to push centers of gravity 31 away from the center of rotation of outer race 14 and inner race 16, moving cams 20 into the wedged orientation. Note that whereas gravity only tends to move some cams 20 into the wedged orientation, centrifugal force will tend to move all cams 20 into the wedged orientation.

With reference to FIGS. 1 and 2, the advantage provided by rollers 22 will now be discussed. Rollers 22 assure constancy of the spacing between outer race 14 and inner race 16. This constancy is maintained despite the tendency of the spacing to oscillate due to side loading placed upon sheave 12 by the V-belt which drives the alternator. Because the spacing does not oscillate, fretting wear of cams 20 is minimized.

Various modifications and variations will no doubt occur to those skilled in the arts to which this invention pertains. Such variations which generally rely on the teachings through which this disclosure has advanced the art are properly considered within the scope of this invention. For example, the clutch disclosed in this disclosure is not limited to transmitting torque from an outer race to an inner race. Torque can also be transmitted from an inner race to an outer race. In fact, if the direction of rotation of alternator 10 were reversed from direction of rotation 40, the clutch of the present invention would allow clutch inner race 16 to transmit torque to clutch outer race 14. Torque transmission from clutch outer race 14 to clutch inner race 16 would be prevented.

What is claimed is:

1. An overrunning clutch comprising:
   (a) a driving race with a substantially cylindrical surface with a substantially circular cross section, said race having an axis of rotation normal to and through the center of the substantially circular cross section of said race;
   (b) a driven race with a substantially cylindrical surface concentric with and facing said driving race, said driven race having a common axis of rotation with said driving race; and
   (c) a plurality of cams distributed between said driving and said driven race, each cam comprising:
      a locking portion comprising a first locking surface and a second locking surface, said locking portion having a profile such that there is an orientation in which said locking portion is wedged between said driving race and said driven race, allowing torque transfer from said driving race to said driven race in a predetermined direction, but not allowing torque transmission from said driven race to said driving race in said same predetermined direction;
      each said cam having a center of gravity such that centrifugal force applied at said center of gravity will move said locking portion of said cam into said wedged orientation;
      wherein said cams are distributed such that regardless of rotational position of said clutch races, at least one said cam is also moved into said wedged orientation by gravitational force acting at said center of gravity.

2. An overrunning clutch as recited in claim 1 wherein the driving race is located outside the driven race.

3. An overrunning clutch as recited in claim 2 further comprising:
   a plurality of rollers disposed between said driving race and said driven race and in rolling contact with both said races; and
   a cage further comprising first and second side walls and a plurality of pins, each pin with a first end and a second end, each first end attached to said first side wall and each second end attached to said second side wall;
   wherein said cams each further comprise a U-shaped portion attached to said locking portion, and wherein said cams are disposed such that said pins are located within said U-shaped portions of said cams.

4. An overrunning clutch as recited in claim 3 wherein the number of said cams is 8.

5. An overrunning clutch as recited in claim 4 wherein the number of said rollers is 8.

6. An overrunning clutch as recited in claim 3 wherein said rollers are cylindrical in shape, have an axial bore, and are rotatably disposed on said pins.

7. An overrunning clutch as recited in claim 1 wherein gravity engages a sufficient number of said cams to allow said clutch to be engaged when said clutch begins to rotate from rest.

8. An overrunning clutch comprising:
   a driving race with a substantially cylindrical surface;
   a driven race with a substantially cylindrical surface concentric with said substantially cylindrical surface of said driving race; and
   at least one torque transfer means disposed between said races for transferring torque from said driving race to said driven race in a predetermined direction and for preventing torque transmission from said driven race to said driving race in said same predetermined direction, said means capable of engagement by centrifugal force applied at a center of gravity of said means;
   wherein at least one of said torque transfer means also engages by gravitational force acting at the center of gravity of said at least one torque transfer means.

9. An overrunning clutch as recited in claim 8 further comprising a plurality of rollers disposed between said driving race and said driven race and in rolling contact with both said races.

10. An overrunning clutch as recited in claim 8 wherein gravity engages a sufficient number of said cams to allow said clutch to be engaged when said clutch begins to rotate from rest.

* * * * *